(12) United States Patent
Berding

(10) Patent No.: US 6,512,396 B1
(45) Date of Patent: Jan. 28, 2003

(54) HIGH SPEED DATA PROCESSING SYSTEM AND METHOD

(75) Inventor: Andrew R. Berding, Scottsdale, AZ (US)

(73) Assignee: Arizona Digital, Inc., Scottsdale, AZ (US)

( * ) Notice: Subject to any disclaimer, the term of this patent is extended or adjusted under 35 U.S.C. 154(b) by 0 days.

(21) Appl. No.: 09/322,497

(22) Filed: May 28, 1999

Related U.S. Application Data

(60) Provisional application No. 60/117,879, filed on Jan. 29, 1999, and provisional application No. 60/125,963, filed on Mar. 24, 1999.

(51) Int. Cl.$^7$ ................................................. H05K 1/14
(52) U.S. Cl. ......................... 326/101; 326/26; 361/788
(58) Field of Search ............................. 326/93, 101, 21, 326/26; 361/792, 788

(56) References Cited

U.S. PATENT DOCUMENTS

| | | |
|---|---|---|
| 3,267,394 A | 8/1966 | Peil et al. |
| 4,679,872 A | 7/1987 | Coe |
| 4,697,858 A | 10/1987 | Balakrishnan |
| 4,738,632 A | 4/1988 | Schmidt et al. |
| 5,060,111 A | 10/1991 | Takashima |
| 5,091,822 A | 2/1992 | Takahsima |
| 5,119,273 A | 6/1992 | Corda |
| 5,122,691 A | 6/1992 | Balakrishnan |
| 5,175,515 A | 12/1992 | Abernathy et al. |
| 5,210,682 A | 5/1993 | Takashima |
| 5,448,208 A | 9/1995 | Honjo |
| 5,509,066 A | 4/1996 | Saligny |
| 5,541,369 A | 7/1996 | Tahara et al. |
| 5,568,361 A | 10/1996 | Ward et al. |
| 5,696,667 A | 12/1997 | Berding |
| 5,764,489 A | 6/1998 | Leigh et al. |
| 5,930,119 A | 7/1999 | Berding |

*Primary Examiner*—Don Phu Le
(74) *Attorney, Agent, or Firm*—Snell & Wilmer

(57) ABSTRACT

A backplane of a data processing system is configured to include a current boost circuit for each net. The boost circuit is coupled to a common point for the net and is triggered to provide a boost current in response to a detected change in a signal on the net. The boost circuit has the capacity to provide a considerably larger drive current than does the conventional driver on the circuit board connected to the backplane. Thus when a conventional driver starts to drive a signal on the net from one logic state to the other, the boost circuit detects the initiation of change and supplies a boost current to cause a rapid change in logic state. Preferably each terminal on the net is coupled to the common point by a trace which includes both a highly conductive portion and a portion including a damping impedance. The damping impedance is chosen to approximate the characteristic impedance of the trace coupling the terminal to the common point and the associated loading of that trace.

10 Claims, 7 Drawing Sheets

HIGH SPEED DATA PROCESSING SYSTEM AND METHOD

CROSS-REFERENCE TO RELATED APPLICATIONS

This application claims priority from provisional application Serial No. 60/117,879 filed Jan. 29, 1999 and from provisional application Serial No. 60/125,963 filed Mar. 24, 1999.

BACKGROUND OF THE INVENTION

1. Field of the Invention

The present invention relates generally to method and apparatus for increasing the speed and number of slots in a data processing system backplane, and more particularly to method, circuit and system for increasing speed and capacity of a data processing system by boosting drive current in computer backplanes.

2. Description of the Related Art

In general, computer backplanes are used for interconnecting circuit boards in a high-speed data processing system. More particularly, computer backplanes are configured with a plurality of connectors for receiving the circuit boards. The connectors are interconnected with terminals, usually pins, and traces to form a bus for carrying signals between the connectors. Here a bus is defined as a collection of similar signals such as 64-bits of data and the term "backplane" is intended to encompass backplanes, motherboards, and even an individual circuit board. Typically, a driver circuit on one circuit board at one connector sends a signal along the bus to be received and decoded by a receiver circuit on another circuit board at another connector.

The ever increasing demand for more computing power and speed, however, has placed a severe load on conventional driver circuits of backplanes. In general, the desired drive current to send a signal can be represented by the formula:

$$I = C \times dV/dT$$

Accordingly, the desired drive current is proportional to the total net capacitance ("C"), which is the sum of the capacitance of the backplane, the capacitance of all the connectors, the capacitance of all the stubs, and the capacitance of all the drivers and receivers. In a conventional VME ("Versa Module European") backplane or a Compact PCI ("Peripheral Component Interface") backplane, such capacitance can readily equal 450 pico-farads or 250 pico-farads, respectively. Additionally, the drive current is proportional to the desired voltage change ("dV"). Typically, in order to send and receive a valid signal, a voltage change of approximately 2.0 volts is desired. The drive current, however, is inversely proportional to the desired rise-time or fall-time ("dT"). In general, the faster the desired data transfer, the faster the desired transition times, and the greater the required drive current. For example, in a 33 megahertz Compact PCI bus, a transition time of approximately 15 nano-seconds is desired, thus a minimum driver current of at least 33 milliamps is required. For a 66 megahertz Compact PCI bus, a minimum driver current of at least 66 milliamps is required. However, a conventional Compact PCI driver typically can provide a maximum of only 8 milliamps. Consequently, conventional Compact PCI busses are limited to 8 slots at 33 megahertz and 4–5 slots at 66 megahertz, which presents a severe system design limitation. PCI-X (a double speed 133 Megahertz proposal advocated by several computer manufacturers) allows only 3 slots. To attempt to overcome the problems of slot limitations, PCI-to-PCI bridges have been proposed. Although such bridges may increase performance by allowing operations on multiple bus segments simultaneously, they introduce other problems. They interfere with data latency and interrupt determinacy, they use up one precious load on each bus segment, and they cannot be hot-swapped (replaced with power on) and they are very difficult to package and service.

Some improvement in backplane performance is achieved in accordance with the teachings of U.S. Pat. No. 5,696,667, the disclosure of which is herein incorporated by reference, but the need still exists for an increase in operating speed and in the number of slots that can be accommodated on a data system backplane.

SUMMARY OF THE INVENTION

In accordance with one embodiment of the present invention, a boost circuit on a computer backplane is configured to supplement the drive current provided by the circuit board driver circuits. More particularly, as a driver begins to drive a signal positive (i.e., from a logic low state to a logic high state), when the signal passes a lower threshold, the boost circuit engages to provide a current larger than the current provided by the driver in order to switch the signal above an upper threshold more quickly. When the signal passes the upper threshold, the boost circuit disengages and the driver suitably maintains the signal at the higher level. Similarly, when the driver starts to drive the signal negative (i.e., from a logic high state to a logic low state), as the signal passes the upper threshold, the boost circuit engages to provide a current larger than the current provided by the driver in order to cause the signal to transition to a level below a lower threshold more quickly. When the signal again passes the lower threshold, the boost circuit disengages and the driver suitably maintains the signal at the lower level.

In accordance with another embodiment of the invention, a boost circuit is provided to supplement the drive current provided by the drivers on a computer backplane and the supplemental current is driven through a damping impedance.

BRIEF DESCRIPTION OF THE DRAWINGS

The present invention will hereinafter be described in conjunction with the appended drawings wherein.

DETAILED DESCRIPTION OF PREFERRED EXEMPLARY EMBODIMENTS

The subject matter of the present invention is particularly suited for use in connection with a backplane configured in accordance with the VME320 standard or with the PCI or Compact PCI standards, but is also applicable to a wide variety of backplanes in data communication environments. For ease of discussion, an exemplary embodiment of the present invention is described in the context of a VME320 backplane. It should be recognized, however, that such description is not intended as a limitation on the use or applicability of the present invention, but is instead provided to enable a full and complete description of the exemplary embodiment.

Figure 1:
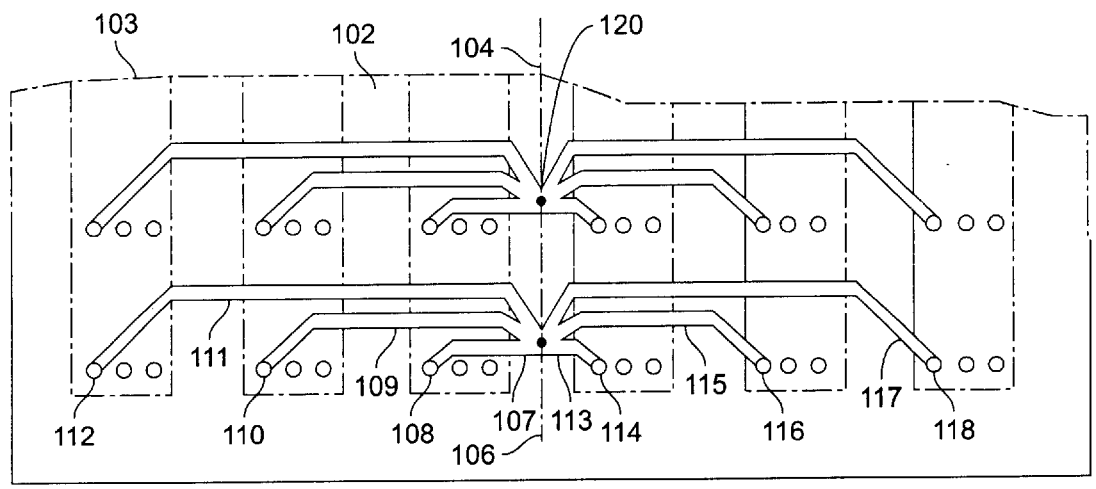
FIG. 1 illustrates a portion of a prior art backplane.

FIG. 1 illustrates a conventional backplane 102 including a plurality of connectors 103 and a plurality of pins arranged in an array of rows and columns, with each connector 103 configured with columns which are three pins wide. Other implementations of the VME and other backplanes use connectors that are five or more rows wide. Additionally, other connectors may use terminals other than pins. In this description the term "pins" shall be used to encompass all such terminals including pins, edge connectors, and the like used to electrically couple a circuit board to a backplane. The location of the connectors is indicated schematically by a dot-dash line. In accordance with the VME320 standard, each common pin is connected by a separate trace to a common point. For example, in the bottom row of pins, the left-hand pin of each connector 103 is connected to a common point 106 by a separate trace emanating from common point 106. Specifically, a trace 107 connects pin 108 to common point 106; a trace 109 connects pin 110 to common point 106; a trace 111 connects pin 112 to common point 106; a trace 113 connects pin 114 to common point 106; a trace 115 connects pin 116 to common point 106; a trace 117 connects pin 118 to common point 106; and so on, for all commonly connected pins on all connectors. Thus each point in a net is coupled to a common point by an individual trace. The term "net" refers to all pins carrying a common signal. In a similar manner, a common point 120 is connected to the left-hand pins in the second row, as are the remaining pins (not shown) on the backplane 102 that are to be connected together. In this manner, common point 106, common point 120, and the other common points on the backplane 102 define a set of common points for the connectors 103 along a centerline 104 on backplane 102. For a more complete discussion of the VME320 backplane, refer to U.S. Pat. No. 5,696,667, issued Dec. 9, 1997, the entire content of which is incorporated herein by reference. It is not necessary that the common points be located along the centerline, but that location is optimum for most applications. Likewise, it is not necessary that the "common point" actually be a point. Instead it can be a common region, for example, extending across slots 9–13 in a 21-slot backplane.

Drivers and receivers typically are used to transmit signals between connectors 103 on backplane 102. For example, a signal can be transmitted from pin 112 to pin 110 by using a driver connected to pin 112 and a receiver connected to pin 110. The signal sent by the driver travels along traces 111 and 109 to the receiver. It should be appreciated, however, that the specific path by which a signal is transmitted from one pin to another can vary depending on the particular application. Typically each board will have a driver for driving a signal on the commonly connected traces. The signal will likely include an address so that the information is received only by the intended board having that address.

In general, the signals transmitted between connectors 103 on backplane 102 are ideally square wave pulses. In the context of backplanes, a received signal with a voltage greater than a first specified value is typically defined as a logic "high" or "1". A received signal with a voltage less than a second specified value is typically defined as a logic "low" or "0". For the VME320 standard, the first and second specified values are 2.0 volts and 0.8 volts, respectively. Any voltages between 2.0 and 0.8 volts are considered to be at an indeterminate logic level and logic circuits randomly interpret the voltage as either a logic high or a logic low with unpredictable results.

Figure 2:
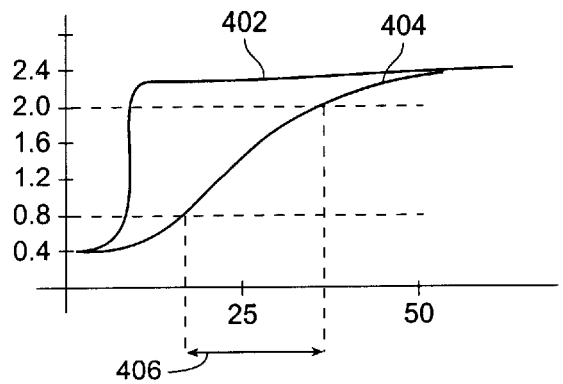
FIGS. 2 and 3 illustrate graphically the rise time and the fall time, respectively, of signals transmitted on backplanes.
Figure 3:
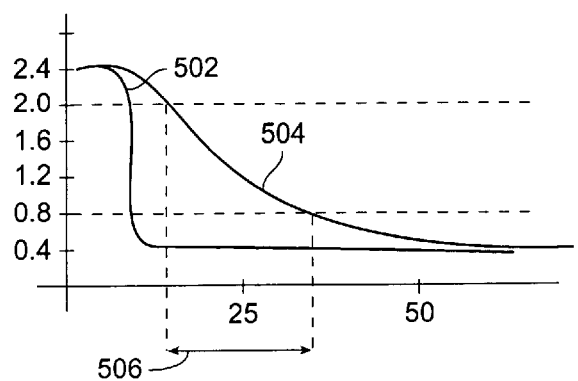

In FIG. 2 an idealized waveform 402 is depicted as having virtually no rise time (i.e., the time required to switch from a logic low to a logic high state). However, waveform 404 having a rise time 406 to switch from a logic low state to a logic high state is more realistic for prior art backplanes and prior art drivers. Similarly in FIG. 3, an idealized waveform 502 is depicted as having virtually no fall time (i.e., the time required to switch from a logic high to a logic low state). A more realistic waveform 504 is depicted as having a fall time 506 to switch from a logic high state to a logic low state. In an idealized situation in which the drivers have a nearly infinite current drive capability and in which the circuitry has nearly zero parasitic capacitance, the idealized waveforms can be approached. In the real world of limited drive capacity and substantial parasitic capacitance, such idealized waveforms cannot be achieved with prior art backplanes. The rise time 406 of the waveform 404 and fall time 506 of the waveform 504 are due in part to the capacitance of the connectors, stubs, drivers, receivers, and traces of the backplane. The limited current capacity of conventional drivers also contributes to longer rise and fall times. The greater the number of boards coupled to the backplane, the greater the capacitance that must be driven and the slower the rise and fall times. The requirement or need for some reasonable maximum in rise and fall times determines, in part, the maximum number of boards that can be accommodated on a backplane at a specified data rate.

Figure 4:
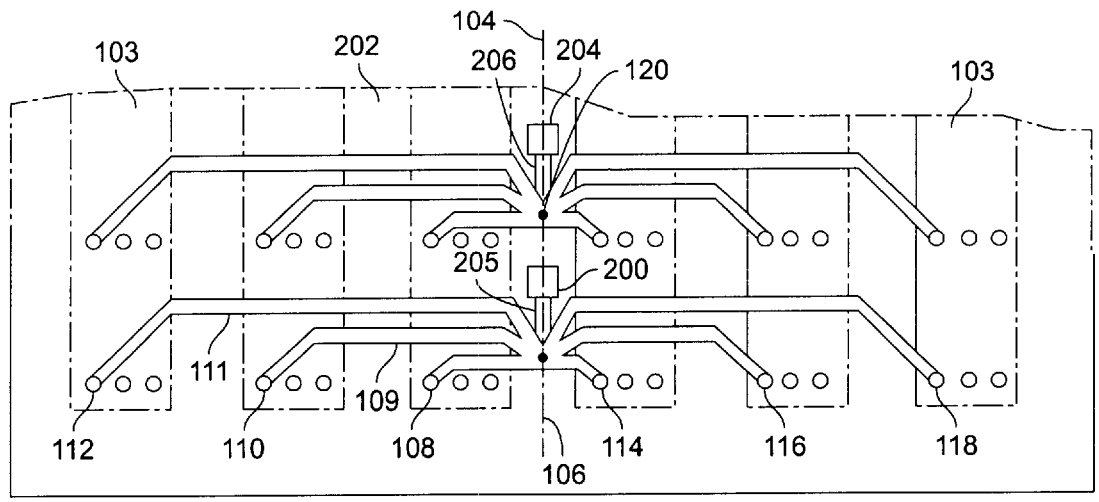
FIG. 4 illustrates a portion of a backplane configured with a boost circuit in accordance with one embodiment of the present invention.

FIG. 4 illustrates an improved backplane 202 in accordance with one embodiment of the invention. Like backplane 102 of FIG. 1, backplane 202 includes a plurality of connectors 103 and a plurality of pins arranged in an array of rows and columns. Common pins are connected to a common point such as common point 106 or 120 by individual, separate traces. For example, common pins 112 and 110 are connected to common point 106 by traces 111 and 109, respectively. In accordance with the invention, however, a boost circuit 200 is coupled to common point 106 and a boost circuit 204 is coupled to common point 120. Thus a boost circuit is coupled to the common point in each net. Preferably, each boost circuit is located in close proximity to but slightly removed from its associated common point and is coupled to that common point by a short trace 205, 206, respectively. Simulations have shown that circuit performance is slightly enhanced by having the boost circuit slightly removed from the common point rather than being located at the common point. The small series inductance of the short trace 205, 206 causes a beneficial peaking that improves the resulting waveforms. The boost circuit is configured to supplement the drive current provided by the driver circuit to reduce signal rise and fall times. As noted above, the drivers are located on the individual circuit boards and therefore are not shown in any of the Figures. In one embodiment of the invention, as a driver starts to drive a signal positive (i.e., from a logic low state to a logic high state), when the signal passes a lower threshold voltage, the boost circuit engages in order to provide a current larger than the drive current provided by the driver to switch the signal above an upper threshold voltage more quickly. When the signal passes the upper threshold voltage, the boost circuit disengages and the driver suitably maintains the signal at the higher level. Similarly, as the driver starts to drive the signal negative (i.e., from a logic high state to a logic low state), when the signal passes the upper threshold voltage, the boost circuit engages in order to provide a current larger than the drive current provided by the driver in order to switch the signal below the lower threshold voltage more quickly. When the signal passes the lower threshold voltage, the boost circuit disengages and the driver suitably maintains the signal at the lower level. In addition to enhanced switching speeds achieved with backplanes configured in accordance with the invention, backplanes configured in accordance with the invention can have many more circuit boards inserted while maintaining the same performance. Furthermore, because the bulk of the drive current is provided by the boost circuit, power dissipation by the drive circuit is minimized.

The boost circuit is triggered by changes in the signal (either by voltage changes or by current changes) from the circuit board driver circuit. The boost circuit then drives the entire backplane. The current available from the boost circuit to drive the backplane is much greater than the current available from the circuit board driver alone. Since there is only one boost circuit in each net, as opposed to one driver for each slot in the backplane, the output current from the boost circuit can be made as high as desired without adding appreciably to the net capacitance. This is in contrast to the alternative situation of increasing the drive current capability of the circuit board driver because typically, as drive current is increased, output capacitance increases concurrently, resulting in little benefit. Because the circuit board driver circuit only has to supply the trigger current instead of the total transient current, the driver can be relatively small and still work satisfactorily. For example, the 8 milliamp limit specified for Compact PCI backplanes is adequate to supply the trigger current to switch the boost circuit which drives the entire backplane.

Because the circuit board driver only has to supply the small trigger current, and that current has to flow only until the boost circuit switches, this results in: very low driver power dissipation, minimal transient current from the power distribution network on each card, little crosstalk current between backplane traces, and insignificant ground bounce on the circuit boards.

Figure 5:
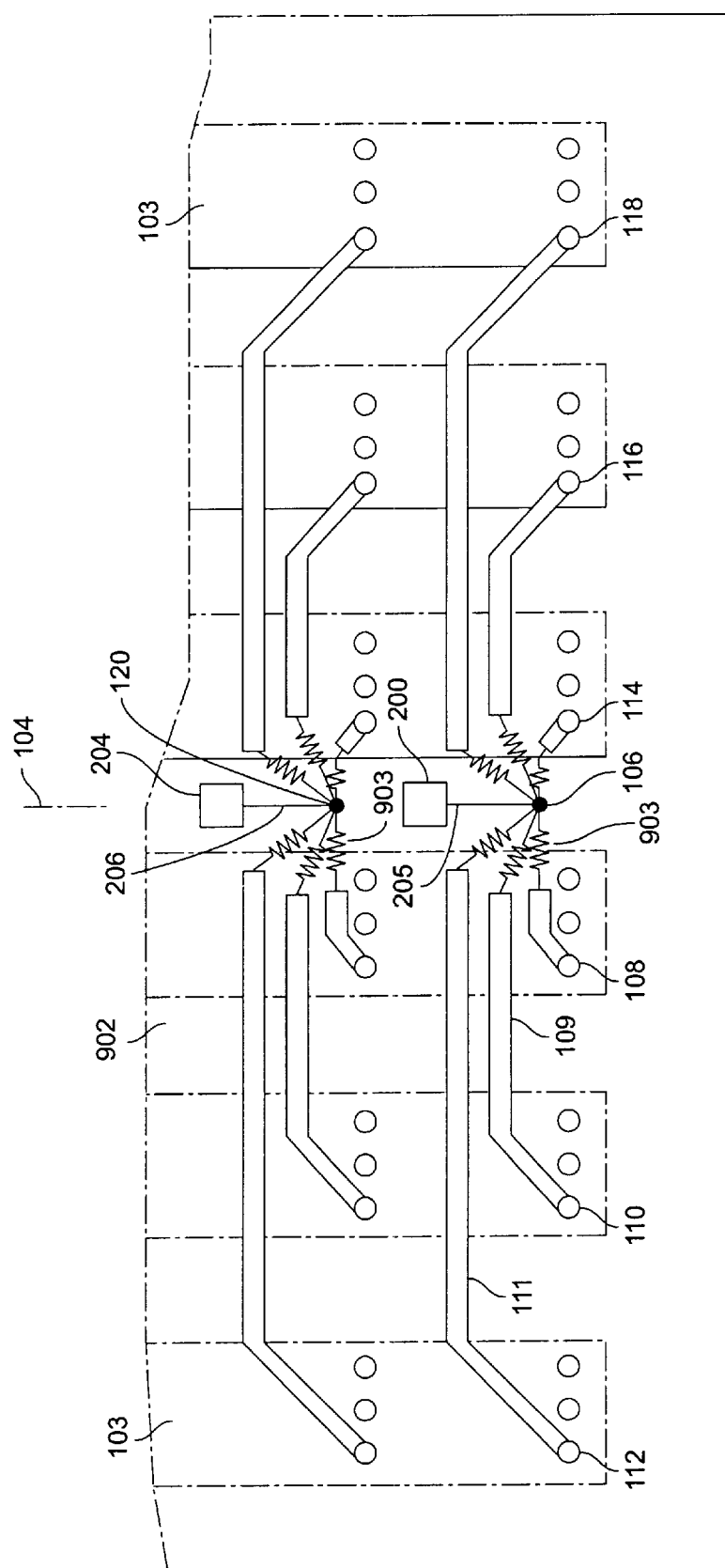
FIG. 5 illustrates a portion of a backplane in accordance with a further embodiment of the invention.

FIG. 5 illustrates a backplane 902 in accordance with a further embodiment of the invention. Like backplane 202 of FIG. 4, backplane 902 includes a plurality of connectors 103 and a plurality of pins arranged in an array of rows and columns. Common pins are connected to a common point such as common point 106 or 120 by individual, separate traces. For example, common pins 112 and 110 are connected to common point 106 by traces 111 and 109, respectively. Additionally, a boost circuit 200 is coupled to point 106 by short trace 205 and a boost circuit 204 is coupled to common point 120 by short trace 206. Thus a boost circuit is coupled to the common point in each net. In accordance with this embodiment of the invention, however, the commonly connected pins are not connected directly to the common points 106, 120, but rather are coupled through a damping impedance 903. Each of the traces such as trace 111 coupling pin 112 and trace 109 coupling pin 110, respectively, to common point 106 includes such a damping impedance 903. Although coupling the common pins through individual traces to a common point such as common point 106 helps in making the circuit act like a simple lumped inductance and capacitance rather than as a complex transmission line as is explained in U.S. Pat. No. 5,696,667, the traces still retain some aspects of transmission line characteristics, especially at high frequencies. The use of damping impedance 903 in coupling each of the individual traces such as traces 111 and 109 to common point 106 acts as a parallel termination for signals transmitted to common point 106 and as a series termination for signals transmitted from common point 106.

Because the driver on each card or circuit board sees a short, high impedance transmission line with a parallel termination at the far end, there are no reflections and there are ideal current or voltage waveforms to trigger the boost circuit. Damping resistors 903 used in this manner can totally eliminate all signal reflections on the associated traces and thus can remove the major performance limitations to backplanes. The boost circuit sees a series terminated transmission line to each slot, including the stub into each card. Therefore, there are no reflections and there are ideal waveforms at the receivers.

Ideally the value of each damping impedance 903 should be equal to the characteristic impedance of the individual trace (and associated loading) coupled to that damping impedance. Exact matching of the impedance value is impractical for a number of reasons. For example, backplanes are often manufactured for general application without an exact knowledge of the boards to be plugged into the connectors provided on the backplane. In addition, boards may be inserted or removed from the backplane from time to time, and each change in configuration will change the characteristic impedance of the associated traces. As a compromise, a value in the range of approximately 65 ohms resistive can be selected for the damping impedance 903. The damping impedance is illustrated in FIG. 5 as being a resistor. Damping impedance 903 can be a resistor, but preferably is a resistor in parallel with a small capacitance. The presence of the capacitance helps to peak the driving waveform which compensates somewhat for the shunt capacitance of the load. The damping resistors can be implemented as discrete resistors, surface mount resistors, SIPs, buried resistors, or other well known backplane or printed circuit board technology.

The power dissipation of the boost circuit is about the same as the total amount of power that would otherwise have been dissipated by the traditional driver on every card. The boost circuit is preferable to adding buffers on each card for several reasons. For example, having boost circuits on the backplane allows backward compatibility with existing circuit boards. Furthermore, on backplanes configured in accordance with this embodiment of the invention, much of the power dissipated in driving the traces will now be dissipated in the passive resistors instead of in the boost circuit, and this improves reliability. In addition, the series resistor acts as a current limiter for the circuit board driver, thus limiting over-drive conditions. Likewise, the series resistor also acts as a current limiter for the boost circuit, thus limiting its over-drive conditions.

A boost circuit for use with either the embodiment illustrated in FIG. 4 or the embodiment illustrated in FIG. 5 preferably has the following characteristics. A sensing circuit senses when the signal from a driver exceeds some minimum specified threshold value. The threshold value can be a specified voltage value or a specified current value. The sensing of a specified current value is particularly preferred when using the embodiment of the invention illustrated in FIG. 5. Upon sensing that the signal from the driver has exceeded the minimum specified value, the boost circuit supplies an additional current in order to cause a rapid transition from the low state to the high state. When using voltage sensing, upon reaching a second specified threshold voltage value, the boost circuit is disabled and the circuit board driver circuit maintains the signal at the high level. Similarly, when the driver starts to drive the signal from a high state to a low state, a sensing circuit senses when the signal from the driver falls below a specified voltage value or a specified current value. Upon sensing that the signal from the driver has fallen below the specified threshold value, the boost circuit supplies an additional current in order to cause a rapid transition from the high state to the low state. When using voltage sensing, upon reaching the minimum threshold voltage value the boost circuit is disabled and the driver maintains the signal at the low level. During the transition, either from the low state to the high state or from the high state to the low state, a circuit such as a latch circuit maintains the boost circuit in an engaged state so as to avoid oscillations.

Figure 6:
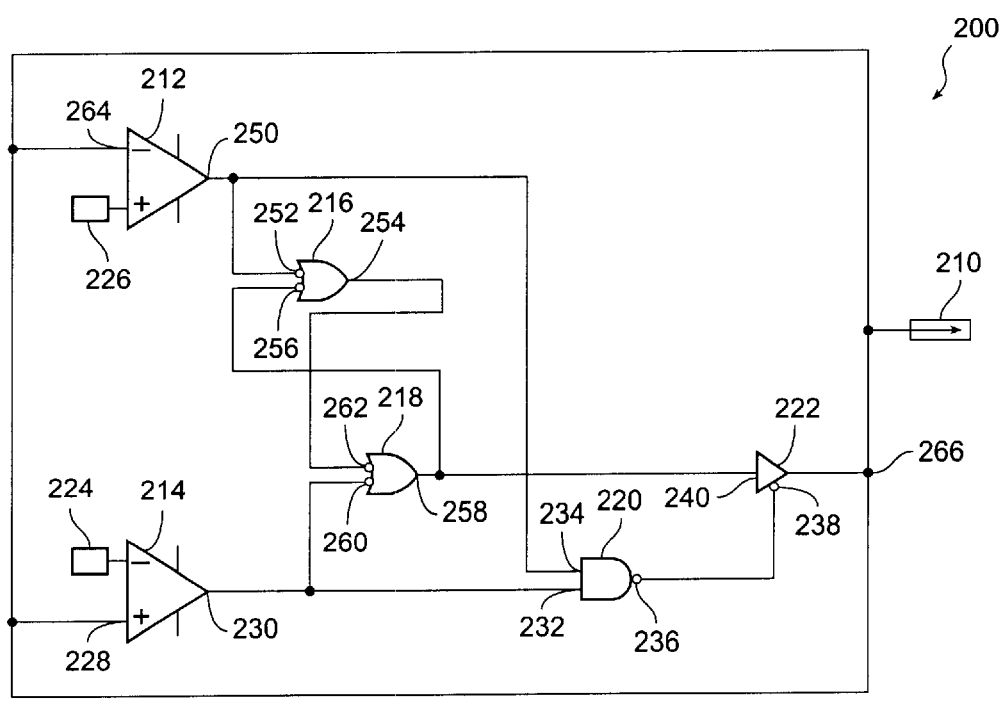
FIG. 6 illustrates schematically a boost circuit in accordance with one embodiment of the present invention.

As stated above, in the context of many conventional backplanes, a signal with a voltage less than 0.8 volts is typically defined as being at a logic low state. A signal with a voltage greater than 2.0 volts is typically defined as being at a logic high state. Accordingly, when using specified voltages as the threshold values, boost circuit 200 is preferably configured with a lower threshold of 0.8 volts and an upper threshold of 2.0 volts. FIG. 6 illustrates one boost circuit 200 in accordance with the invention. Pin 210 provides an input to the boost circuit and is coupled to the common point. Boost circuit 200 includes a negative comparator 214 to which a reference voltage 224 of about 0.8 volts is coupled. Similarly, a reference voltage 226 of about 2.0 volts is coupled to a positive comparator 212. It should be appreciated, however, that the boost circuit 200 can be configured with any suitable lower and upper thresholds depending on the particular application. In addition, of course, with backplanes having other defined "high" and "low" states, it may be advantageous to select other values for the threshold values.

Accordingly, when pin 210 is at a logic low state (i.e., the common point and the traces associated with the common point are either not being driven by a signal or are being driven by a signal with a voltage less than 0.8 volts), an input 228 of negative comparator 214 is at a logic low state (i.e., below 0.8 volts), and an output 230 of negative comparator 214 is at a logic low state. This results in an output 236 of a NAND gate 220 being high as input 232 of NAND gate 220 is low. Thus a tri-state circuit 222 is disabled and no additional current is added or subtracted at a junction 266. Additionally, an output 258 of a latch 218 is high which makes the output 254 of a latch 216 low. As the output 254 of latch 216 is connected to an input 262 of a latch 218, the output 258 of latch 218 is held high regardless of the condition of input 260.

When the driver on a circuit board connected to pin 210 drives a signal with a voltage somewhat greater than 0.8 volts (that is, a voltage between threshold 224 and threshold 226) into pin 210, output 230 of negative comparator 214 goes high and output 250 of positive comparator 212 remains high. Thus, output 236 of NAND gate 220 goes low which enables tri-state circuit 222 and the signal at pin 210 is driven more positive as input 240 of tri-state circuit 222 is high. In accordance with one aspect of the present invention, the signal at pin 210 is driven with a current considerably higher than the drive current of the circuit board driver connected to pin 210. In an exemplary embodiment, the signal at pin 210 is driven by circuit 222 with a current in the range of 100 to 200 milliamps, and preferably about 150 milliamps whereas the driver circuit on the circuit board and connected to pin 210 may only be able to drive 8 milliamps. When the signal at pin 210 is driven past the upper threshold of 2.0 volts, output 250 of positive comparator 212 goes low. This results in output 236 of NAND gate 220 going high, thus disabling tri-state circuit 222. Additionally, output 254 of latch 216 goes high which makes the output 258 of latch 218 go low. The circuit will remain in this state until the driver connected to pin 210 drives the signal low.

When the driver on the circuit board and connected to pin 210 then drives the signal somewhat lower than 2.0 volts (that is, between the upper threshold 226 and the lower threshold 224), output 250 of positive comparator 212 goes high. As output 230 of negative comparator 214 is high, output 236 of NAND gate 220 goes low, thus enabling tri-state circuit 222. As output 258 of latch 218 is low, the signal at pin 210 is driven lower by circuit 222 with a current considerably higher than the drive current supplied by the driver connected to pin 210. In an exemplary embodiment, the signal at pin 210 is driven by circuit 222 with a current in the range of 100 to 200 milliamps, and preferably about 150 milliamps, whereas the driver circuit connected to pin 210 may only be able to drive 8 milliamps. When the signal at pin 210 is driven past the lower threshold of 0.8 volts, output 230 of negative comparator 214 goes low. This results in output 236 of NAND gate 220 going high, thus disabling tri-state 222. The circuit will remain in this state until the driver connected to pin 210 drives the signal high.

Figure 7:
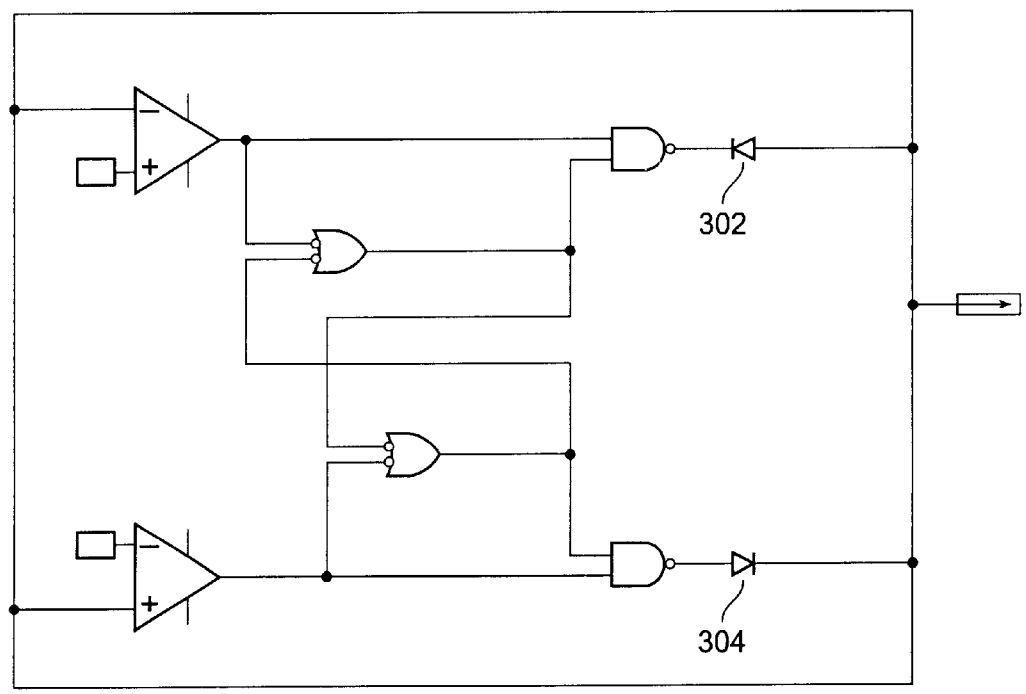
FIG. 7 illustrates schematically an alternate boost circuit in accordance with another embodiment of the present invention.

It should be appreciated that boost circuit 200 is an exemplary embodiment of the present invention and that various changes can be made without departing from the spirit and scope of the present invention. For example, with reference to FIG. 7, a negative driver 302 and a positive driver 304 can be used to drive the signal negative and positive, respectively, rather than tri-state 222 (FIG. 6). Additionally, either embodiment of the boost circuit (FIG. 6 or FIG. 7) can be configured to include various other compatible circuits elements such as terminating resisters, overshoot diodes, and the like.

Figure 8:
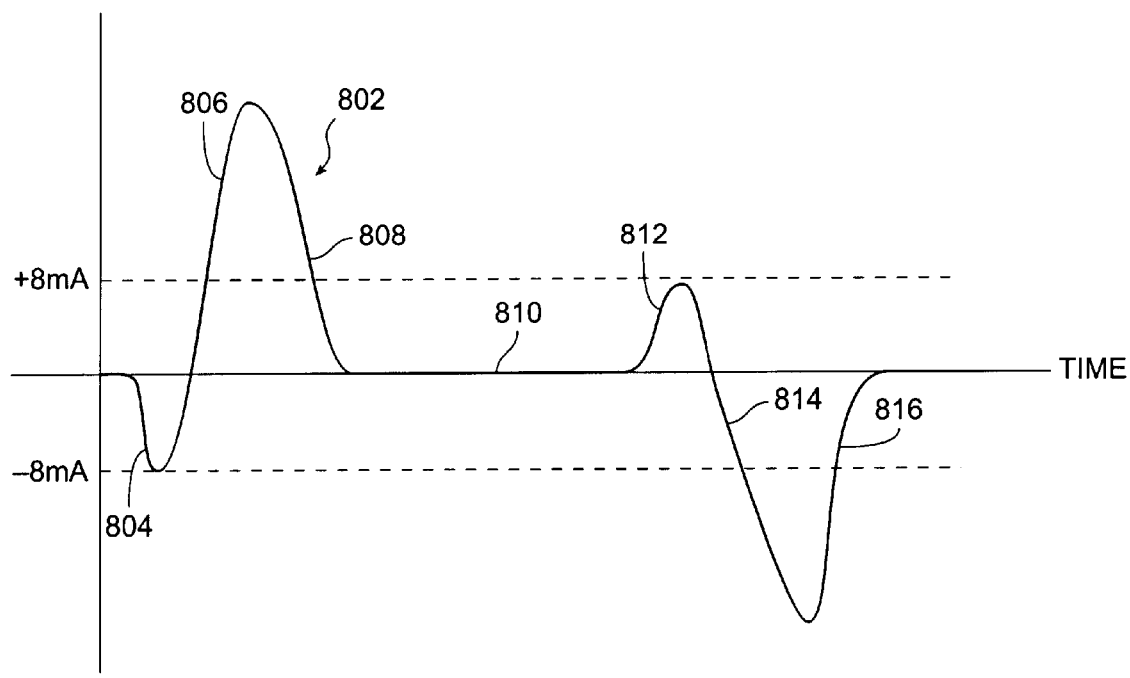
FIG. 8 illustrates graphically the rise and fall times of a signal using a boost circuit configured to respond to a change in the signal current in accordance with various aspects of the present invention.

Alternatively, rather than sensing voltage changes, a boost circuit according to various aspects of the present invention can be suitably configured to respond to current changes. As noted above, sensing current changes is especially advantageous with the embodiment illustrated in FIG. 5. With reference to FIG. 8, unlike boost circuit 200 (FIG. 6), a boost circuit configured to respond to current changes remains enabled at all times. As depicted by portion 804 of curve 802, after the current decreases to a lower threshold, such as negative 8 milliamps, then a circuit board driver may be engaged to drive the signal positive(i.e., to change the logic state). This causes the boost circuit to engage in order to provide current in the opposite direction of a magnitude considerably higher than the drive current available from the driver. In an exemplary embodiment, the signal is driven with a current in the range of 100 to 200 milliamps, and preferably with a current of about 150 milliamps.

Similarly, as depicted by portion 812 of curve 802, after the current decreases to an upper threshold, such as positive 8 milliamps, then a circuit board driver may be engaged to drive the signal negative. This causes the boost circuit to engage in order to provide a current in the opposite direction of a magnitude considerably higher than the current supplied by the circuit board driver. In an exemplary embodiment, the signal is driven by the boost circuit with a current in the range of 100 to 200 milliamps, and preferably with a current of about 150 milliamps. It should be recognized that various upper and lower current values can be used depending on the particular application.

Although not specifically illustrated in the Figures, the boost circuit can also be configured as an edge triggered D-latch. The boost circuit would then be inactive, regardless of driver current, until clocked by the appropriate clock signal. Such an embodiment could completely remove all circuit board driver skew.

Figure 9:
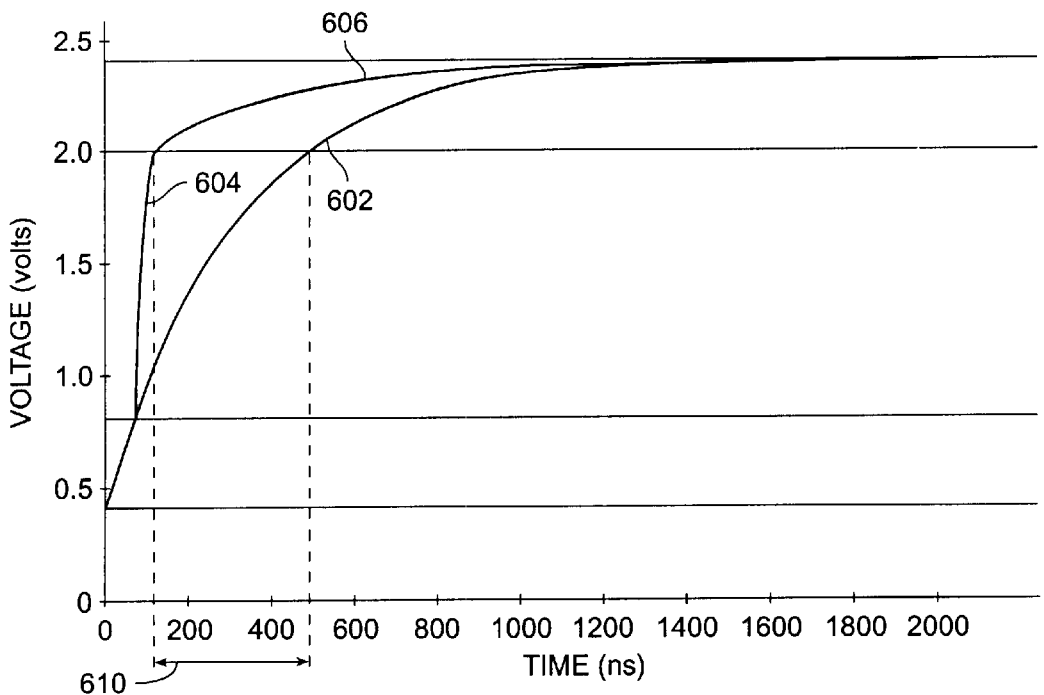
FIGS. 9 and 10 graphically compare the rise time and fall time of signals in a system using a boost circuit in accordance with the invention to the rise time and fall time of signals in a system that does not use such a boost circuit.
Figure 10:
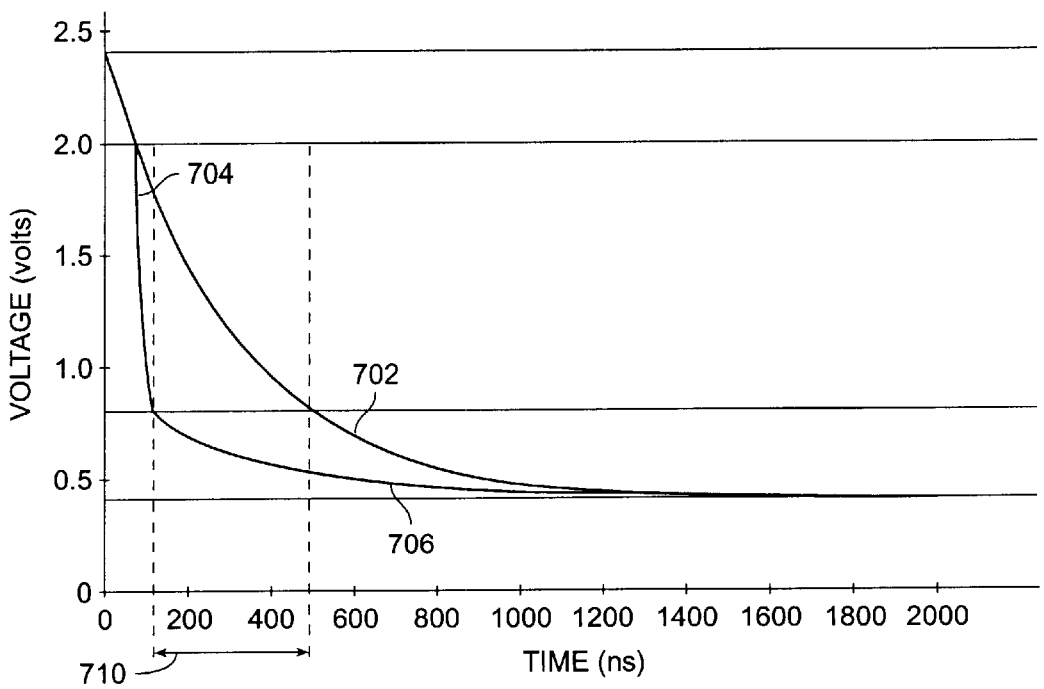

FIGS. 9 and 10 illustrate the improvement in rise and fall time that can be experienced by using the boost circuit of FIG. 6 in the embodiment of backplane illustrated in FIG. 4. As illustrated in FIG. 9, boost circuit 200 can significantly reduce the rise time of a signal from a lower threshold of about 0.8 volts to a value exceeding an upper threshold of about 2.0 volts. More particularly, line 602 depicts the rise time for a signal to be driven from a level of about 0.8 volts to past about 2.0 volts without boost circuit 200. Similarly, line 604 depicts the rise time for a signal to be driven from about 0.8 volts to past about 2.0 volts with boost circuit 200. A significant rise time differential 610 is noted between the two results. Line 606 depicts the signal being driven by the circuit board driver after the boost circuit 200 is disengaged.

In similar manner FIG. 10 illustrates the significant reduction in fall time of a signal from an upper threshold of about 2.0 volts to a lower threshold of about 0.8 volts that can be achieved by the use of a boost circuit 200 in accordance with the invention. More particularly, line 702 depicts the fall time for a signal to be drive down from about 2.0 volts to past about 0.8 volts without boost circuit 200. In contrast, line 704 depicts the fall time with boost circuit 200. The fall time differential 710 between the two results shows a substantial improvement. Line 706 depicts the signal being driven by the circuit board driver after the boost circuit 200 has been disengaged.

By reducing both rise and fall times, the boost circuit 200 (FIG. 6 as applied to the backplane of FIG. 4) facilitates increased operating speed of the backplane and thus of the data processing system. The additional current capacity provided by the boost circuit 200 also facilitates increasing the number of boards connected to the backplane, even at the increased operating speed.

Although the exemplary embodiments thus far have been described in the context of a VME320 backplane or a Compact PCI backplane, the present invention can be used with various backplane architectures, such as VME, PCI, PCI-X, and other standard and/or custom backplanes. A boost circuit in accordance with various aspects of the present invention is particularly well suited for use with a Compact PCI backplane as they typically have drivers with less current capacity in comparison to VME backplanes. Thus, the operating speed of a Compact PCI backplane and the maximum number of circuit boards that can be connected to the Compact PCI backplane can be increased by configuring the Compact PCI backplane with a boost circuit in accordance with various aspects of the present invention.

Figure 11:
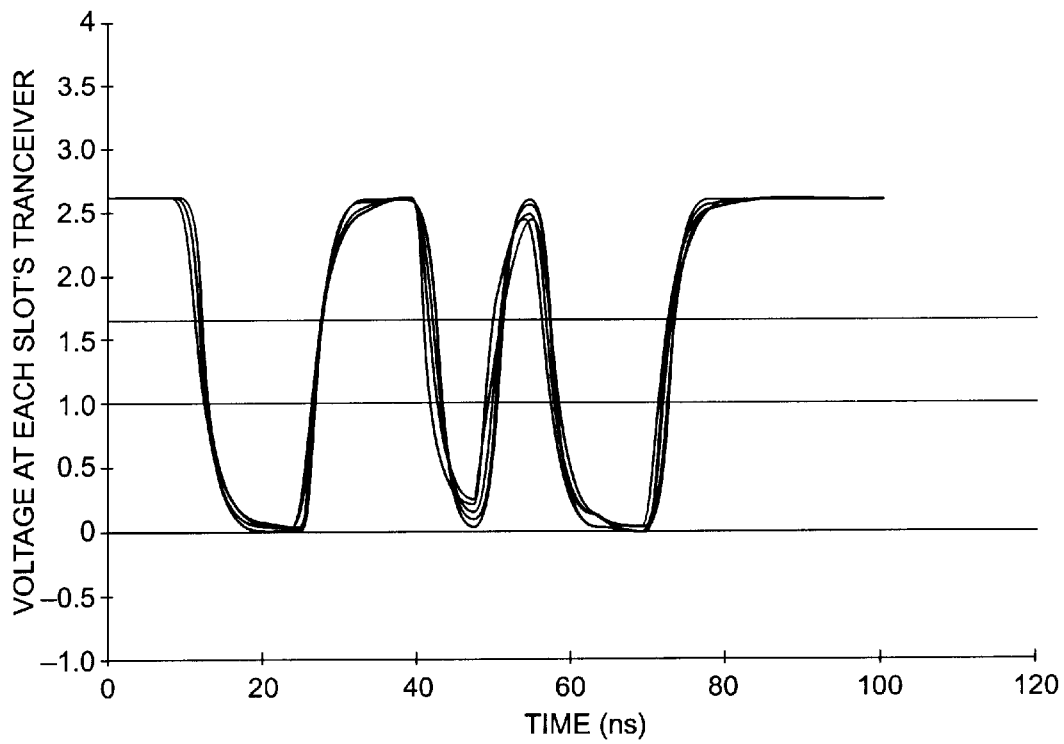
FIGS. 11–14 illustrate simulated results achieved with various configurations in accordance with the invention in contrast to results achieved with prior art systems.
Figure 12:
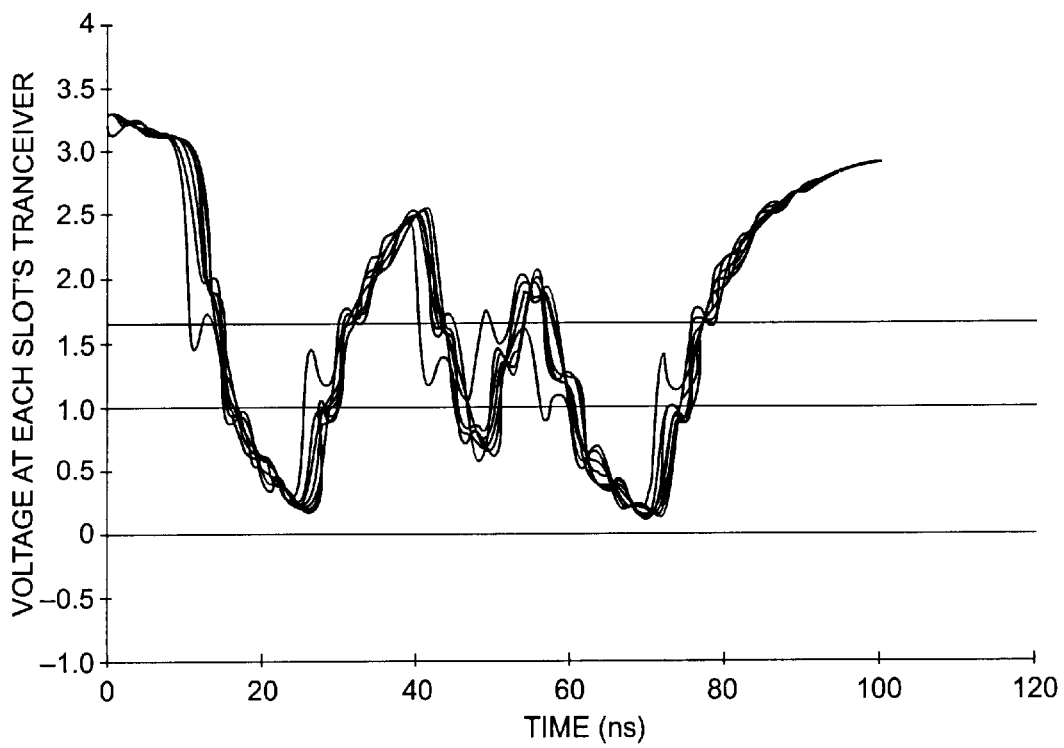

The improvement to be realized by implementing the invention in the context of a Compact PCI backplane is illustrated by the results shown in FIGS. 11–14. These Figures illustrate two extremes encountered in data processing systems: a fully loaded backplane and a minimally loaded backplane. For each of the extremes, results of simulations are depicted for a backplane in accordance with the invention in contrast to a prior art backplane. The results in each Figure depict the voltage received at the receiver on each of the circuit boards mounted on the backplane as a function of time in response to an input drive signal. All of the simulations were done at 133 Megahertz. FIG. 11 depicts results obtained in computer simulations on a fully loaded 21-slot Compact PCI backplane configured in accordance with the invention. The boost circuit was coupled to a common point located proximate to slot 11. In contrast, FIG. 12 depicts results of simulations on a conventional 8-slot Compact PCI backplane. Even with 21 slots, the results with the backplane in accordance with the invention are far superior to the 8-slot prior art backplane.

Figure 13:
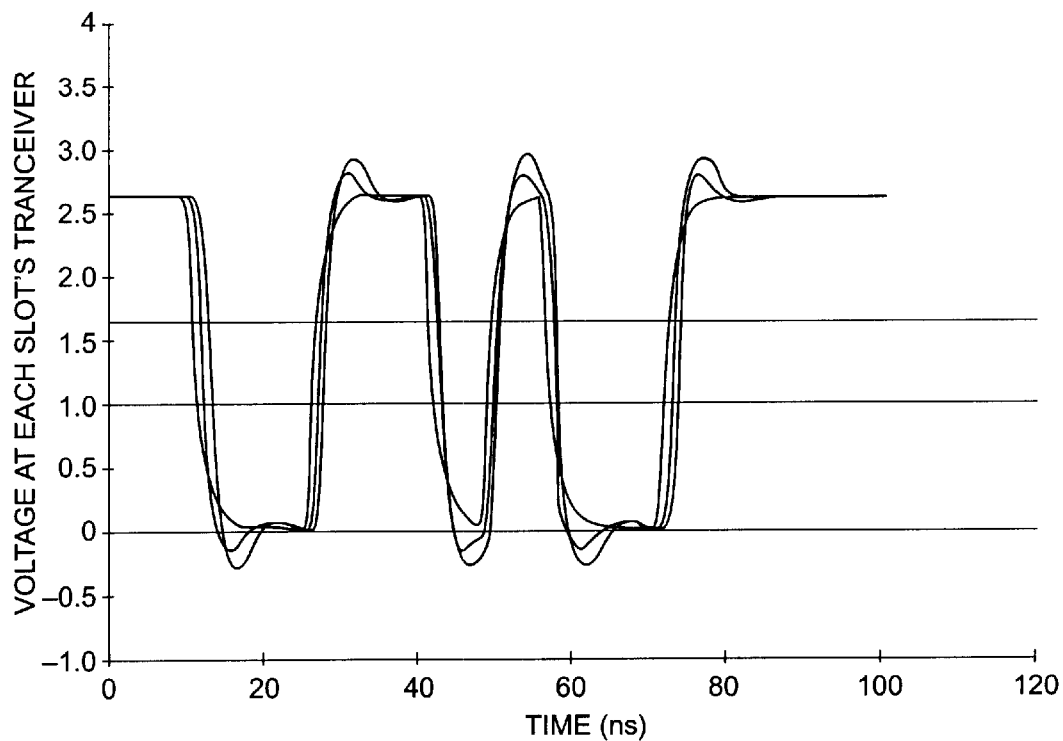
Figure 14:
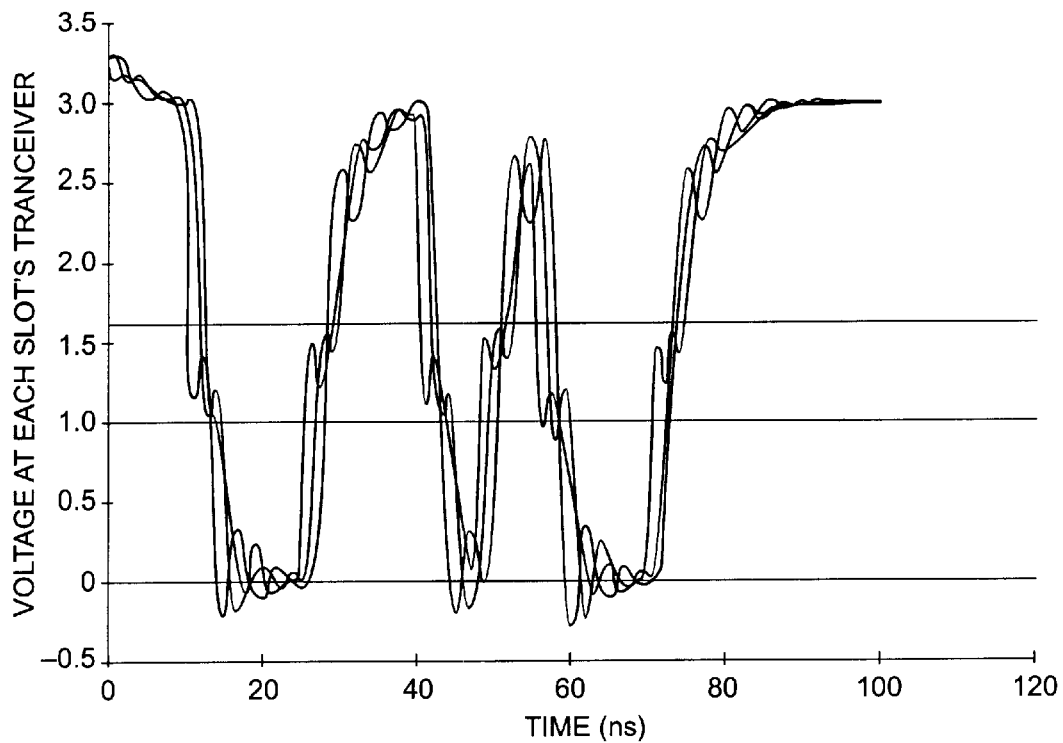

FIGS. 13 depicts results obtained in computer simulations on a minimally loaded 21-slot Compact PCI backplane configured in accordance with the invention. Circuit boards were loaded only in slots 1, 11 and 18. In comparison, FIG. 14 depicts results obtained in similar simulations on a minimally loaded 8-slot prior art Compact PCI backplane with circuit boards in slots 1, 2 and 8.

Although the present invention has been described in conjunction with particular embodiment illustrated in the appended drawing figures, various modifications may be made without departing from the spirit and scope of the invention. Therefore, the present invention should not be construed as limited to the specific form shown and described above.

What is claimed is:

1. A data processing system including a backplane and a plurality of logic boards each connected to said backplane, wherein said system comprises:
    a backplane including a plurality of connectors attached to said backplane for receiving said logic boards, each of said connectors having a plurality of terminals;
    a plurality of common points on said backplane;
    a plurality of conductive traces electrically coupling common terminals from said plurality of connectors to one of said common points;
    a driver on each of said logic boards for driving a signal on said conductive traces;
    a boost circuit on said backplane proximate one of said common points and capable of supplying a boost current to said common point and to said conductive traces in response to the detection of a signal from said driver.

2. The system of claim 1 wherein each of said conductive traces includes a highly conductive portion and an impedance element coupling said highly conductive portion to said common point.

3. The system of claim 2 wherein said impedance element has an impedance approximately equal to the characteristic impedance of said conductive trace.

4. The system of claim 1 wherein said boost circuit comprises a detector capable of detecting the rise of said signal from a value less than a threshold value to a value greater than said threshold value and a latch circuit capable of causing said boost circuit to continue supplying said boost current until said signal exceeds a second threshold value.

5. The system of claim 4 further comprising a detector capable of detecting the fall of said signal to a value less than said second threshold value and a latch circuit capable of causing said boost circuit to continue supplying said boost current until said signal is less than said threshold value.

6. The system of claim 1 wherein said boost circuit is coupled to said common point by an inductance.

7. A method for operating a data processing system having a backplane on which a plurality of terminals are electrically coupled to a common point and to which a plurality of circuit boards are connected by connectors, said circuit boards including a driver circuit for driving signals on said terminals, the method comprising the steps of:

coupling said common point to a current boost circuit located on said backplane and having a greater current drive capacity than said driver circuit;

detecting the value of a signal supplied by said drive circuit;

triggering said boost circuit to supply a first current to said common point and said terminals coupled thereto to cause a transition from a low logic state to a high logic state in response to said detected value exceeding a first threshold value; and triggering said boost circuit to supply a second current opposite to said first current to said common point and said terminals coupled thereto to cause a transition from a high logic state to a low logic state in response to said detected value falling below a second threshold value.

8. The method of claim 7 wherein said step of detecting the value comprises detecting the voltage level of said signal and wherein the method further comprises terminating the supply of said first current by said boost circuit in response to said detected voltage level exceeding said second threshold value during said transition from said low logic state to said high logic state.

9. The method of claim 8 further comprising the step of terminating the supply of said second current by said boost circuit in response to said detected voltage value falling below said first threshold value during said transition from said high logic state to said low logic state.

10. A data processing system comprising:

a backplane having a plurality of nodes, each having a common signal associated therewith;

a common point;

a plurality of traces, each electrically coupling one of said nodes to said common point;

a driver circuit coupled to one of said nodes to change the logic state of a signal on said node; and a boost circuit coupled to said common point and having a greater current drive capacity than said driver circuit, said boost circuit responsive to changes in levels of said signal detected on said node.

\* \* \* \* \*